United States Patent [19]

Braden et al.

[11] Patent Number: 5,401,806
[45] Date of Patent: Mar. 28, 1995

[54] BIOCOMPATIBLE MOULDABLE POLYMERIC MATERIAL

[75] Inventors: Michael Braden, Harpenden; Allison O. Okpojo, Manchester, both of England

[73] Assignee: The Secretary of State for Health in Her Britannic Majesty's Government of the United Kingdom of Great Britain and Northern Ireland

[21] Appl. No.: 84,210

[22] PCT Filed: Jan. 3, 1992

[86] PCT No.: PCT/GB92/00009
§ 371 Date: Jul. 19, 1993
§ 102(e) Date: Jul. 19, 1993

[87] PCT Pub. No.: WO92/12189
PCT Pub. Date: Jul. 23, 1992

[30] Foreign Application Priority Data

Jan. 4, 1991 [GB] United Kingdom ............... 9100097

[51] Int. Cl.[6] ................. C08F 265/02; C08F 265/06; A61F 2/18; B29C 33/40; C08J 3/28
[52] U.S. Cl. .................................. 525/301; 525/305; 525/304; 522/120; 523/104; 523/113; 524/773; 623/10; 424/422; 424/437; 264/222
[58] Field of Search ................... 525/301, 305, 309; 522/120; 523/109, 113; 524/773; 623/10; 424/422, 437; 264/222

[56] References Cited

U.S. PATENT DOCUMENTS

| | | |
|---|---|---|
| 4,472,342 | 9/1984 | Carr . |
| 4,490,497 | 12/1984 | Evrard et al. . |
| 4,739,002 | 4/1988 | Ishikawa et al. . |
| 4,782,118 | 11/1988 | Fontanille et al. . |
| 4,791,150 | 12/1988 | Braden et al. . |
| 4,834,927 | 5/1989 | Birkholz et al. . |
| 4,909,887 | 3/1990 | Wagenknecht et al. . |
| 5,045,266 | 9/1991 | Moro et al. . |

FOREIGN PATENT DOCUMENTS

| | | |
|---|---|---|
| 0088845 | 9/1983 | |
| 0138232 | 10/1984 | European Pat. Off. . |
| 0318357 | 1/1991 | Japan . |
| 652057 | 4/1951 | United Kingdom . |
| 1053529 | 1/1967 | United Kingdom . |

OTHER PUBLICATIONS

K. W. M. Davy, "The Mechanical Properties of Elastomeric Poly(alkyl methacrylate)s", Biomaterials, vol. 8, No. 5, 12 Feb. 1987, Guildford GB, pp. 393–396.

*Primary Examiner*—Vasu S. Jagannathan
*Attorney, Agent, or Firm*—Nixon & Vanderhye

[57] ABSTRACT

A biocompatible moldable curable polymer/monomer system capable of curing at ambient temperatures to provide an elastomer product while producing a lower exotherm than previously used systems. The system includes an alkyl acrylate or methacrylate homopolymer or copolymer; a monomer mixture of higher alkylacrylate or methacrylate combined with one or more of acrylic acid, methacrylic acid and their lower alkyl esters; and a plasticizer and optionally cross-linking agents, anti-tack agents, and activators or photoinitiators. The moldable systems is a dough used for making earmoulds and earpieces or in fabrication of prostheses.

32 Claims, No Drawings

BIOCOMPATIBLE MOULDABLE POLYMERIC MATERIAL

The present invention relates to elastomer forming systems which are mouldable at ambient temperatures and which have a low reaction exotherm on setting, to kits comprising the components of such systems and to elastomer materials formed from them. These systems are particularly applicable to techniques for taking impressions of sensitive parts of human and animal bodies and for formation of prostheses. More particularly they are useful in the fabrication of earmoulds and ear impressions for use in hearing aid applications.

Dimensional accuracy of audiological materials, satisfactory handling characteristics and adequate service life are all fundamental requisites of an effective hearing aid fitment programme. Existing commercially available audiological materials have several limitations in so far as they show a high degree of dimensional instability and those whose shrinkage values are within acceptable clinical limits are difficult to handle and expensive. Two-stage earmould materials (eg Molloplast-$\beta$) that provide good acoustic seal when used together with an impression material of superior dimensional stability (e.g. Otoform AK) are difficult to work with. Venting, surface polishing, bevelling and trimming are difficult to achieve and tubing tends to collapse when mounted within them.

Hard acrylic, which is durable, easily workable in terms of venting and surface polishing, etc, fails to provide good acoustic seal where high gain is required and comfort cannot be ensured due to its texture. Available acrylic based material, cold-cure acrylic poly(methylmethacrylate), which is used for one stage earmould making suffers from the following limitations:

(i) The setting reaction is highly exothermic, leading to potential discomfort and even damage to the aural tissues;

(ii) High degree of shrinkage (23% by volume for the monomer; 8% by volume for monomer/polymer mix) on setting, leading to dimensional inaccuracy of the impression, with consequences for the accuracy of the final earmould;

(iii) Rigidity, causing red, sore and inflamed ears, resulting from physical irritation by the roughness of the surface of the finished mould;

(iv) Strong fumes from the monomer cause headaches unless a ventilated room is used and (v) Excessive dryness of the skin is caused when handling the materials (see Bulmer, British Journal of Audiology, 7, 5-8 (1973).

Poly (methyl methacrylate) cold-cure materials have been formally withdrawn from audiological applications in the developed world for such reasons.

Although previous studies (eg, Combe and Nolan, Scandinavian Audiology, 18 67-73 (1989) have recognised the need to formulate products that meet with audiological requirements, further investigations into polysulphides and acrylic based materials for impression taking were discouraged due to their reported handling characteristics and lack of stability.

The present invention provides novel acrylate based materials, particularly homopolymers and copolymers of the higher methacrylates, and their use, inter alia, as audiological and prosthetic moulding materials. These materials provide the advantages of being (i) bio-compatible with tissues, (ii) easily mixed to the required consistency without handling the material, (iii) low in cost, (iv) having a suitable shelf life, (v) much lower in exotherm and shrinkage on setting and (vi) ambient temperature cure.

Previous uses of higher methacrylates have included formation of so-called soft acrylics as soft lining materials for dentures, maxillo-facial prostheses and soft earmould materials (Parker and Braden, Journal of Dentistry (1982) 10, 149-153. There have also been investigations of the properties of cross-linked higher poly -(methacrylates) for testing as ear mould materials (Davy and Braden, Biomaterials (1987) 8, 393-396.

Typical formulations produced by these workers comprised components which would be processed by the dough technique whereby a powder of suspension polymerised copolymer is mixed with liquid monomer to form a dough.

Components used in those formulations comprised:
(i) a copolyer powder containing an initiator;
(ii) monomer liquid;
(iii) plasticizer;
(iv) cross-linking agent;
(v) activator and
(vi) anti-tack agent (which also reduces internal friction in extrusion).

Studies have consistently demonstrated that the most accurate process for making earmoulds at the present time is the one-stage approach (Combe and Nolan, Scandinavian Audiology, (1989) 18, 67-73), but that the weakest component of this approach is material. Audiological use requires sufficient fluidity to enable the materials to be loaded into a standard audiological syringe and then injected into the external auditory meatus in the manner of the standard audiological clinical technique. The use of higher methacrylates (i.e.:$C_7$ to $C_{20}$ esters) by these workers was found to result in requirement for temperatures of the order of 80° C. to 100° C. in order to cure; clearly unsuited to the one-stage method.

Similarly it is noted that the currently available dimensionally stable silicone based impression materials for a two-stage earmould process introduce a problem in wax-dipping, have set backs of poor dimensional stability and have low resistance to tearing. It is therefore necessary to develop new criteria that would be a guide to development of suitable clinical material which itself can be used as a one-stage earmould material and yet would still be suitable for ear impression material for the two-stage earmould process.

The following set of desirable properties are considered appropriate in developing a clinical product suitable for audiological use:

(i) Biocompatibilty with aural tissues: the monomer system should be non-toxic, non-irritant and the setting reaction should have a low exotherm;

(ii) Suitable handling characteristics: when the powder and monomer are mixed the consistency of the dough formed should be such as to enable easy syringing into the ear using commercially available syringes with a sufficient working time of about 2 to 3 minutes and a setting time of about 4 to 7 minutes;

(iii) Dimensional stability: shrinkage should be minimal, not more than 2 to 3% linear; and dimensional stability over different temperature and humidity ranges as might be encountered in various applicable ambients (e.g., tropical use);

(iv) Suitable mechanical or rheological properties: the set material should be elastomeric with freedom from permanent deformation; resilience; adequate strength to prevent tearing or breakage on removal from the ear or during processing such as core boring, insertion of sound tubes, venting; satisfactory consistency and texture to provide comfort; ease of use with the minimum of equipment (preferably no drilling); compatibility with wax if used as an impression material in the two-stage process and with available tubing material generally.

(v) Durability: the components should have adequate shelf life for the requirements of storage and distribution and the final product should have an acceptably high service life;

(vi) Function: the final earmould should have potential for handling high acoustic gain required for users of high powered hearing aids;

(vii) Cosmetics: the final earmould material should be aesthetically pleasing and have no offensive odour;

(viii) Management: the material should be capable of being easily cleaned with ordinary water and washing up liquid.

It is an object of the present invention to provide novel mouldable curable polymer/monomer systems and biocompatible polymeric materials produced from them. It is a further object of the present invention to provide such systems and materials produced from them which are suitable for either audiological or prosthetic uses or both, particularly for use in the one-stage and/or two-stage earmould material preparation and having improved properties in at least some of the respects outlined in the list (i) to (viii) above over the known materials. The novel polymer/monomer system is based upon use of a higher ($C_7$ to $C_{20}$ alkyl) acrylate or methacrylate based monomer component which is capable of curing at ambient temperatures with an acceptable lower exotherm. The preferred compositions and elastomers of the invention are improved in all respects (i) to (viii).

The present invention provides a mouldable curable polymer/monomer system comprising a polymer component, a monomer component and a plasticizer characterised in that:

(a) the polymer component comprises one or more polymers of molecular weight of from 300,000 to 2,000,000 which each comprise repeat units of one or both of general formula I and general formula II:

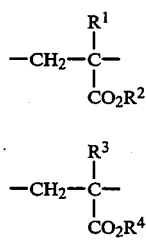

wherein $R^1$ and $R^3$ are the same or different and are selected from H or methyl and $R^2$ and $R^4$ are the same or different and are selected from alkyl groups containing from 1 to 6 carbon atoms, but wherein either $R^3$ is different to $R^1$ or $R^4$ is different to $R^2$ and;

(b) the monomer component comprises 80 to 99% weight of a monomer of general formula III:

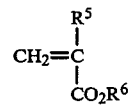

where $R^5$ is H or methyl and $R^6$ is an alkyl group of from 7 to 20 carbon atoms;

together with from 1 to 20% weight of a monomer of formula IV:

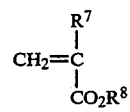

wherein $R^7$ is H or methyl and $R^8$ is H or an alkyl group containing from 1 to 3 carbons.

Preferably the ratio of the polymer component to the total of the monomer component and the plasticizer is from 5:1 to 1:2 weight:weight and the ratio of the monomer to the plasticizer is from 85:15 to 35:65 weight:weight. More preferably the polymer component is provided in a ratio of from 3:1 to 1:1, more preferably about 5:2, weight:weight to the total weight of the monomer and the plasticizer.

The polymer may be a homopolymer or a copolymer but for audiological use it preferably comprises random copolymers of $C_1$ to $C_6$ alkyl esters of methacrylic acid, for example ethyl/methyl- or n-butyl/ethylmethacrylate copolymers. The ratio of the ester components in the copolymer may vary from 10:90 to 90:10, more preferably from 20:80 to 80:20 and particularly from 30:70 to 70:30 weight to weight, e.g. 60:40. Most preferably the polymer component comprises a random copolymer of n-butyl/ethyl methacrylates corresponding to a copolymer comprising repeats of formula I wherein $R^1$ is methyl and $R^2$ is n-butyl and repeats of formula II wherein $R^3$ is methyl and $R^4$ is ethyl.

Preferably the monomer component monomer of formula III has H as $R^5$ and an alkyl group of from $C_8$ to $C_{16}$ as $R^6$; more preferably $R^6$ is an alkyl group of $C_{13}$. Conveniently the compound of formula III is provided as an isomeric mixture of such monomers having on average 13 carbons in $R^6$ as sold under the tradename 'Methacryl Ester 13' by Rohm Chemie.

Preferably the monomer of formula IV comprises $R^7$ as methyl and $R^8$ as H. Preferably the monomer of formula III comprises 90 to 95% by weight of the monomer component with the monomer of formula IV providing the balance.

Typical suitable plasticizer are fumarates, maleates or itaconates, for example, di-2-ethylhexyl fumarate, di-2-ethylhexyl maleate or di-2-ethylhexyl itaconate, although other suitable plasticizer will occur to those skilled in the art.

Preferably for storage the monomer and plasticizer are combined as a single component, the plasticizer comprising accordingly from 15 to 65% weight of that combined component, thus allowing facile mixing of the polymer and combined components when required. Preferably the combined monomer/plasticizer component comprises from 45 to 75% weight of a monomer of formula II, from 1 to 5% weight of a monomer of formula III and correspondingly from 64 to 20% weight plasticizer content.

In order to enable satisfactory curing on mixing of the polymer, monomer and plasticizer components a cross-linking agent, an activator or photoinitiator, and optionally an anti-tack agent will be added to the components of the polymer/monomer system. Conveniently the anti-tack and cross-lining components are provided in the monomer component and the activator or photoinitiator will be provided in either the monomer or polymer component. Such combinations allow stable storage until dough is required. Suitable amounts of these additives will occur to those skilled in the art but typically will be e.g.: 0.5 to 2% wt cross-linker, 0.2 to 6% photoinitiator or 1 to 6% wt activator, all based on weight of monomer of formula III as 100%.

Typical suitable cross-linking agents include e.g., ethylene glycol dimethylacrylate, triethylene glycol dimethacrylate and/or tetraethylene glycol methacrylate. Typical suitable activators include e.g., N,N-dimethyl-p-toluidine, N,N-dihydroxyethyl-p-toluidine and/or lauryl mercaptan while suitable photoinitiators include e.g. anthraquinone, camphorquinone, N,N-3,5-tetramethylaniline and N,N-dimethyl-p-toluidine. Typical suitable anti-tack agents include silicone oil, zinc stearate and/or liquid paraffin.

The addition to the polymer component of about 1% weight of an activating peroxide, e.g. benzoyl peroxide as an activating compound further reduces the setting time of dough produced on mixing the two components. A suitable form of this component is provided in Lucidol CH50, a benzoyl peroxide/dicyclohexyl phthalate mix containing 50% weight of peroxide thus requiring it to be added as 2% weight of the polymer. Addition of such peroxide reduces the ambient temperature curing time of these systems from about 10 minutes to about 5 minutes. Preferably the polymer component is produced as a powder to enhance it's miscibility with the liquid monomer system. Preferred examples of the polymer component of the system of the invention include those comprising n-butyl methacrylate:ethyl methacrylate random copolymer of ratio 70:30 to 40:60 (n-butyl:ethyl), the most preferred ratio being 60:40. Such a copolymer is available from Bonar Polymers Ltd, County Durham, UK, as are a variety of others.

A preferred system of the invention uses said 60:40, n-butyl methacrylate: ethyl methacrylate random copolymer as the polymer component and a monomer/plasticizer component comprised of Methacrylate Ester 13 and methacrylic acid mixed with di-2-ethylhexyl maleate, ethylene glycol dimethacrylate and N,N dimethyl-p-toluidine.

It will be appreciated that the term 'system' used throughout this specification refers to a combination of components necessary for production of the mouldable material and subsequent elastomer of the present invention. Thus the term 'system' covers such components as presented together in a form suitable for use in preparing a mouldable material or elastomer of the present invention, or as dough itself.

For example, the system may be provided as a kit in which the polymer and monomer components are supplied in a form which prevents them from reacting with each other until desired. Such form may be achieved by keeping both components in separate compartments while including the other active ingredients such as initiators and crosslinkers with one or other of them or in a further separate compartment.

Alternatively, the polymer and monomer components may be supplied in premixed form and the other active ingredients may be provided in a separate compartment or container within the kit for admixture with them when curing is desired. Some photoinitiator cured systems may be provided in completely mixed form in light sealed packages. The precise form most suited to a particular use will be apparent to a man skilled in the art from his selected component's reactivity.

Similarly, the selection of components for a given kit will be influenced by the particular intended use. For use where moulding involves contact of the uncured dough with more delicate parts of the body it will be desirable to keep any exotherm down to a minimum level, notwithstanding the generally low exotherms provided by the systems of the present invention. Such minimal exotherms may be provided, without critical loss of curing rate, by using amounts of monomer IV that are below 5% by weight of the monomer component as a whole.

Furthermore, where tissues are more prone to react to acrylic acid this should be avoided in favour of methacrylic acid for use as said monomer IV. It is known that methacrylic acid itself has some toxic effects and thus for use in earmoulding the preferred level of this component is 10%, more preferably 5% by weight of the monomer component in total.

The polymer/monomer systems of the invention and their application to audiological impression and earmould use will now be illustrated, by way of exemplification only, with reference to the following Examples.

EXAMPLE 1

Two monomer/plasticizer/cross-linking agent/activator component mixtures (A) and (B) were produced having the following compositions in parts by weight:

| Component: | Mixture: (A) | (B) |
|---|---|---|
| Methacryl Ester 13* | 75 | 55 |
| Methacrylic acid* | 5 | 5 |
| Di-2-ethylhexyl maleate+ | 20 | 40 |
| Ethylene glycol dimethacrylate ═ | 0.5 | 0.5 |
| N,N dimethyl-p-toluidine ═ | 2.5 | 2.5 |

* = monomers; + = plasticizer; ═ = cross-linker and activator respectively.

The mixtures were separately mixed with powdered 60:40 n-butylmethacrylate:ethylmethacrylate copolymer (Bonar polymers) in the ratio of 5:2 powder to monomer mixture weight by weight. Both doughs proved to be easily syringeable in the ear and were easily removed at the onset of polymerization. The particle size range of the copolymer component used was approximately from 5 to 85 microns diameter.

EXAMPLE 2

A monomer/plasticizer/cross-linking agent/activator/anti-tack agent component was formulated comprising the following composition as indicated in milliliters:

| Composition: | ml |
|---|---|
| Methacryl Ester 13 (Rohm Chemie) | 27.5 |
| Methacrylic acid | 2.5 |
| di-2-ethylhexylmaleate | 20.0 |
| Ethylene glycol dimethacrylate | 0.25 |
| N,N-dimethyl-p-toluidine | 1.25 |
| Liquid paraffin* | 11.6 |

* = anti-tack agent

The above described liquid composition was mixed with 60:40 (Bonar) n-butylmethacrylate:ethylmethacrylate random copolymer in the ratio of 2.5 grams powdered copolymer per ml of monomer liquid. The dough produced proved to be easily syringeable into the ear and was readily removed at the onset of polymerization.

BIO-COMPATABILITY STUDIES

The material of Example 2 was syringed into the ears of volunteers where it was worn for a period of approximately 5 hours. The volunteers comprised six hearing impaired subjects and two normally hearing adults. No toxic or irritant side effects were seen on the aural tissues of any of the volunteers and the two adults reported that the exotherm on curing was minimal.

Mixing and syringing took of the order of 2 minutes and setting took about 5 minutes at ear temperature. When the material was fully mixed using a bowl and a spatula it became cohesive to the spatula and could easily be loaded into a syringe from it.

It was observed that the cured material finely reproduced the surface of the meatal skin and was elastomeric, resilient, easy to cut and core bore and was highly resistant to tearing. The product polymer has a shiny surface and thus does not require any varnishing. Studies on its interaction with other materials show that it does not discolour available pre-bent tubing after eight weeks observation and said tubing may be stabilised in the cured polymer without the use of glue; vents made in the cured material were noted to remain open unlike other soft earmould materials.

ACOUSTIC SUITABILITY

As can be seen from Tables II and III, the acoustic attenuation of the material of Example 2 compares favourably with known earmould material. The shrinkage of this $C_{13}$ based monomer material was only 8% vol/vol compared to 23% for mainly methylmethacrylate based materials; this is equivalent to only 3% linear shrinkage. Calculations based upon the amount of material used per earmould indicate that only 1% linear shrinkage might be expected.

ATTENUATION VALUES

The acoustic attenuation values obtained with the six hearing impaired subjects using earmoulds produced with the material of Example 2 are shown in Table II. Subject details are given in Table I.

TABLE I

Details of subjects trialing earmoulding using system of Example 2.

| Subject | | | | | | | |
|---|---|---|---|---|---|---|---|
| 01: | male: | 14 yrs: | phonak | PPC-LA | hearing aid: | av Pta(R) | 105 |
| 02: | male: | 15 yrs: | | PPC-2 | : | | 102 |
| 03: | female: | 12 yrs: | | PPC-LA | : | | 112 |
| 04: | male: | 11 yrs: | | PPC-LA | : | | 103 |
| 05: | male: | 13 yrs: | | PPC-LA | : | | 106 |
| 06: | female: | 27 yrs: | | PPC-LA | : | | 105 |

TABLE II

Attenuation values (dB) obtained from soft one-stage earmoulds made from the system of Example II.

| | Frequency (KHz) | | | | | | | | |
|---|---|---|---|---|---|---|---|---|---|
| Subject | 0.2 | 0.5 | 1.0 | 1.5 | 2.0 | 2.5 | 3.0 | 3.5 | 4.0 |
| 01 | 56.3 | 63.4 | 63.8 | 64.3 | 63.2 | 62.9 | 63.7 | 61.2 | 63.6 |
| 02 | 59.9 | 63.4 | 65.5 | 64.9 | 65.4 | 65.0 | 66.6 | 64.5 | 63.4 |
| 03 | 60.1 | 63.1 | 63.6 | 63.7 | 64.3 | 62.0 | 57.7 | 57.8 | 68.8 |
| 04 | 60.0 | 63.2 | 63.4 | 63.2 | 61.1 | 57.7 | 57.2 | 58.2 | 58.6 |
| 05 | 59.8 | 62.6 | 62.6 | 62.4 | 59.3 | 57.0 | 54.8 | 52.6 | 56.2 |
| 06 | 60.1 | 63.3 | 63.9 | 63.7 | 64.6 | 65.8 | 68.4 | 72.3 | 70.3 |
| MEAN | 59.4 | 63.2 | 63.8 | 63.7 | 63.0 | 61.7 | 61.4 | 61.1 | 63.5 |

TABLE III

Analysis of feedback of one-stage earmoulds made from the system of Example II.

| No. of Earmoulds | No Feedback Maxvol $\geq$ NORVOL | Feedback Maxvol $<$ NORVOL | % with Feedback (out of 6) |
|---|---|---|---|
| 6 | 6 | 0 | 0.0 |

MAXVOL = MAXIMUM VOLUME SETTING
NORVOL = NORMAL/USER'S VOLUME SETTING
Using aids shown in Table I The elastomeric earmoulds were core bored and fitted with sound tubes for these evaluations. Examples were highly compatible with currently available PVC tubing and this remained stable within the earmould without glue and without hardening with age. The elastic modulus of the material was such that body temperature caused it to be softer in contact with the ear than on its outer surface. The earmoulds provided ease of insertion and removal, having elastomeric and resilient properties well suited for this purpose. Washing in ordinary warm/cold water and standard washing up liquid caused no observable deterioration.

The systems of the present invention are suitable for further uses: particularly such as provision of soft lining material for the good fitting of dentures and in the provision of maxillo-facial prostheses. It will be realised that many other uses requiring bio-compatible materials that are mouldable and curable in situ yet which do not provide exotherm or toxicity problems may be found for the materials by correct selection of the components. For example, if curing inside a human body one might use methacrylic rather than acrylic acids for toxicity reasons, as stated above. Where the inherent elastomeric and biocompatibility properties of the moulded elastomer material are desired but there is reduced requirement to avoid exotherm or toxicity with the moulding stage, i.e. due to contact with uncured dough, increased amounts of methacrylic acid or acrylic acid may be used. Thus prostheses may be produced outside the body with varying properties and may be cured after moulding away from said body.

We claim:

1. A mouldable, curable polymer/monomer system comprising a polymer component, a monomer component and a plasticizer wherein
(a) the polymer component comprises one or more polymers of molecular weight of from 300,000 to 2,000,000 which each comprise repeat units of one or both of formula I and formula II:

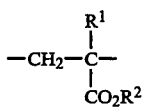

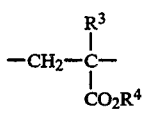

wherein $R^1$ and $R^3$ are the same or different and are selected from the group consisting of H or methyl and $R^2$ and $R^4$ are the same or different and are selected from the group consisting of alkyl groups containing from 1 to 6 carbon atoms, wherein either $R^3$ is different to $R^1$ or $R^4$ is different to $R^2$ and;
(b) the monomer component comprises 80 to 99% weight of a monomer of formula III:

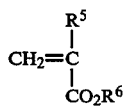

wherein $R^5$ is H or methyl and $R^6$ is an alkyl group of from 7 to 20 carbon atoms; together with from 1 to 20% weight of a monomer of formula IV:

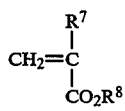

wherein $R^7$ is H or methyl and $R^8$ is selected from the group consisting of H and an alkyl group containing from 1 to 3 carbons.

2. A system according to claim 1 wherein the ratio of the polymer component to the total of the monomer component and the plasticizer is from 5:1 to 1:2 weight:weight and the ratio of the monomer to the plasticizer is from 85:15 to 35:65 weight:weight.

3. A system according to claim 2 wherein the polymer component is provided in a ratio of from 3:1 to 1:1 weight:weight to the total monomer component and the plasticizer.

4. A system according to claim 3 wherein the polymer component is provided in a ratio of about 5:2 weight:weight to the total weight of the monomer and the plasticizer.

5. A system according to claim 1 wherein the polymer component comprises a random copolymer of $C_1$ to $C_6$ alkyl esters of methacrylic acid.

6. A system according to claim 1 wherein the polymer component comprises an ethylmethacrylate/methylmethacrylate random copolymer or an n-butylmethacrylate/ethylmethacrylate random copolymer.

7. A system according to claim 6 wherein the polymer component comprises a copolymer of n-butylmethacrylate and ethylmethacrylate in the ratio 70:30 to 40:60 weight:weight.

8. An audiological earmould or earpiece forming composition comprising a system according to claim 7 which further includes a cross-linking agent, an activator or photoinitiator and an anti-tack agent.

9. A system according to claim 1 wherein the monomer component monomer of formula III has H as $R^5$ and an alkyl group of from $C_8$ to $C_{16}$ as $R^6$.

10. A system according to claim 9 wherein $R^6$ is an alkyl group of $C_{13}$.

11. A system according to claim 10 wherein the monomer of formula III is provided in an isomeric mixture of such monomers having on average 13 carbons in $R^6$.

12. A system according to claim 1 wherein the monomer of formula IV is methacrylic acid.

13. A system according to claim 12 wherein the monomer of formula III comprises 90 to 95% by weight of the monomer component with the monomer of formula IV providing the balance.

14. A system as claimed in claim 1 wherein the plasticizer comprises a fumarate, a maleate or an itaconate.

15. A system as claimed in claim 14 wherein the plasticizer comprises di-2-ethylhexyl fumarate, di-2-ethylhexyl maleate or di-2-ethylhexyl itaconate.

16. A system as claimed in claim 1 further comprising a cross-linking agent and an activator or photoinitiator.

17. An elastomer comprising a system as claimed in claim 16 wherein the polymerisation results from allowing the system to cure.

18. An elastomer as claimed in claim 17 wherein the system is cured at between ambient and body temperature.

19. A system as claimed in claim 1 further comprising an anti-tack agent.

20. A biocompatible impression taking composition comprising a system according to claim 1 wherein the components of the system have been mixed together.

21. A method for forming an impression of a part of a human or animal body comprising use of a dough as provided by the composition of claim 20.

22. A method as claimed in claim 21 wherein said impression comprises part of the meatus of a human ear.

23. A method as claimed in claim 21 wherein the impression is used to form a prosthesis.

24. A method for forming an audiological earmould or earpiece comprising injecting a dough as provided by the composition of claim 20 into a the meatus of a human ear and allowing it to cure.

25. A method for forming a biocompatible curable mouldable dough comprising mixing the components of a system as claimed in claim 1.

26. An elastomer comprising a system as claimed in claim 1 that has been mixed together and polymerised.

27. An earmould or earpiece comprising an elastomer as claimed in claim 26.

28. A prosthesis comprising an elastomer as claimed in claim 26.

29. A mouldable curable polymer/monomer system as claimed in claim 1 wherein the system is curable between ambient and body temperature.

30. A mouldable curable polymer/monomer system as claimed in claim 29 wherein the system is curable in 5 minutes or less.

31. A mouldable curable polymer/monomer system as claimed in claim 1 wherein the system is curable at ear temperature.

32. A mouldable curable polymer/monomer system as claimed in claim 31 wherein the system is curable in 5 minutes or less.

* * * * *